United States Patent Office 3,306,946
Patented Feb. 28, 1967

3,306,946
PROCESS FOR PURIFYING A NORMAL ALPHA OLEFIN MIXTURE OF ITS VINYLIDENE CONTENT
Robert E. Snyder, Oakmont, and Joseph Charles Santoni, Arnold, Pa., assignors to Gulf Research & Development Company, Pittsburgh, Pa., a corporation of Delaware
No Drawing. Filed Apr. 7, 1964, Ser. No. 358,073
17 Claims. (Cl. 260—677)

This invention relates to a process for purifying a normal alpha olefin mixture of its vinylidene content.

Ethylene can be polymerized in the presence of a trialkyl aluminum, such as triethyl aluminum, at a temperature of about 140° to about 325° C. and a pressure of about 1000 pounds per square inch gauge to as high as about 1000 atmospheres, or even higher, for about one minute to about 20 minutes to obtain a mixture containing predominantly (that is, from about 50 to about 99 mol percent, based on the reaction product) normal alpha olefins having from four to 20 carbon atoms, although small amounts of normal alpha olefins having from 22 to 40 carbon atoms, some internal normal monoolefins, some trisubstituted monoolefins and from about 0.5 to about 30 mol percent based on the reaction product of vinylidenes, that is, compounds of the structural formula $R_2C=CH_2$, wherein R is an alkyl group, all having the same number of carbon atoms as the desirable normal alpha olefins, are also produced.

The normal alpha olefin mixture defined above can be treated, for example, by distillation to recover individual normal alpha olefins or fractions containing several individual normal alpha olefins. Unfortunately, the contaminants defined will remain in association with the individual normal alpha olefins or fractions containing the several individual normal alpha olefins. A particularly attractive fraction obtained from the normal alpha olefin mixture is one containing $C_{12}$, $C_{14}$ and $C_{16}$ normal alpha olefins which can be employed in a reaction with benzene to form a straight chain alkyl benzene which can then be sulfonated, or otherwise treated, to form a highly biodegradable detergent. In such cases the vinylidene and trisubstituted contaminants are not desirable, since they will react with benzene to form branch chain alkyl benzenes which when sulfonated will form detergents which are not highly biodegradable. By following the procedure defined and claimed herein vinylidenes are substantially removed from the normal alpha olefin mixture wherein the number of carbon atoms of the olefinic constituents thereof, for reasons that will be set forth hereinbelow, have at least 10 carbon atoms, particularly 12 carbon atoms or more, in the molecule. Trisubstituted contaminants defined herein are not removed by the instant process, and, if required, will have to be removed by other means.

We have discovered that normal alpha olefins or mixtures thereof having at least 10 carbon atoms in the molecule, preferably from 12 to 20 carbon atoms in the molecule, containing contaminating amount of vinylidene compounds can be substantially purified of such vinylidene impurity by the relatively simple expedient of treating such normal alpha olefins with a selected amount of a perfluorocarboxylic acid. We have found that under the conditions defined herein the vinylidene will selectively react with the perfluorocarboxylic acid to form the corresponding ester, while the normal alpha olefin remains substantially unaffected.

The use of a perfluorocarboxylic acid in this context is particularly advantageous. In the normal alpha olefin mixture produced by reaction of ethylene in the presence of a small amount of a trialkyl aluminum catalyst relatively small amounts of $C_4$, $C_6$ and $C_8$ vinylidenes are produced. However, as the carbon number thereof increases the amount of vinylidenes progressively increases. In addition we have found that $C_4$, $C_6$ and $C_8$ normal alpha olefins, the corresponding vinylidenes and the esters resulting from the reaction of the latter with a perfluorocarboxylic acid are soluble in perfluorocarboxylic acids. However, $C_{10}$ and higher normal alpha olefins and $C_{10}$ and higher vinylidenes are substantially insoluble in perfluorocarboxylic acids, while the esters produced as a result of reaction between $C_{10}$ and higher vinylidenes and perfluorocarboxylic acids are soluble in said perfluorocarboxylic acids.

The advantages of this discovery are apparent. In the event normal alpha olefins, vinylidenes are the esters over the entire defined carbon number range were soluble in perfluorocarboxylic acids great difficulty would result in obtaining a purified normal alpha olefin product. In such case resort would have to be had to distillation of the product. This would mean that distillation conditions would have to be maintained over a relatively long period of time, for the lightest boiling materials present are the normal alpha olefins, and they are present in very large amounts. In addition the temperatures required for such distillation would be so high that decomposition of the ester produced, probably to perfluorocarboxylic acid and vinylidene, would result, and a purified product would not be obtained.

It is fortuitous in the present situation that the $C_4$, $C_6$ and $C_8$ normal alpha olefins have associated therewith only small amounts of vinylidenes and therefore are in little or no need of the desired purification. The normal alpha olefins of greater carbon number, however, have greater amounts of vinylidenes associated therewith and are therefore in greater need of such purification. It is with these normal alpha olefins having ten or more carbon atoms that the procedure of the present invention is applicable, particularly normal alpha olefins selected from the group of normal alpha olefins having from 12 to 20 carbon atoms having associated therewith vinylidenes of similar carbon number. This will be apparent from description set forth below.

The basic feature of the present process resides in contacting one or more normal alpha olefins having at least 10 carbon atoms in the molecule, particularly from 12 to 20 carbon atoms in the molecule, which is contaminated with vinylidenes of similar carbon number, with a perfluorocarboxylic acid having from two to four carbon atoms. Examples of such acids that can be employed include trifluoroacetic acid, pentafluoropropionic acid, heptafluorobutyric acid, etc. Of the ones so listed we prefer trifluoroacetic acid.

Normal alpha olefins having ten or more carbon atoms and vinylidenes having 10 or more carbon atoms are substantially insoluble in perfluorocarboxylic acids, whereas the esters produced as a result of reaction between said vinylidenes and said acids are soluble in said acids, and it is this feature that renders the present process particularly attractive. Accordingly, when the hydrocarbon mixture and the perfluoroacetic acid are brought into contact with each other two phases are obtained, an upper hydrocarbon layer and a lower perfluorocarboxylic acid layer. In order to obtain contact between the vinylidenes and the perfluorocarboxylic acid and the mixture is vigorously stirred for a period of time which can be, for example, from about 30 seconds to about 20 minutes. The amount of perfluorocarboxylic acid required is at least the amount stoichiometrically required to selectively react with the vinylidenes and an amount sufficient to dissolve the defined ester produced. Thus, at least about four mols per mol of vinylidene compound present, preferably about 10 to about 20 mols of said acid per mol of said vinylidene in the hydrocarbon mixture to be purified is sufficient.

The reaction conditions required for the defined reaction, while critical, are mild. Thus a temperature of about 0° to about 50° C., preferably about 20° to about 30° C., can be employed. While a temperature up to about 50° C. will tend to solubilize some higher molecular weight normal alpha olefins and corresponding vinylidene compounds and therefore will extend the operative range of the present process, temperatures in excess thereof are to be avoided, since the ester produced will tend to decompose and recontaminate the normal alpha olefins that would otherwise have been purified of their vinylidene content. Pressures do not affect the course of the reaction, and therefore atmospheric pressure is preferred, although pressures as low as about 300 mm. of mercury or as high as about 100 pounds per square inch gauge or even higher can be employed if desired. A reaction time of about one minute to about two hours, preferably about 10 to about 30 minutes is sufficient.

Upon completion of the desired reaction between the vinylidene compounds and the perfluorocarboxylic acid the components of the system are permitted to stand for a period of time which can be, for example, from 30 seconds to about 20 minutes. As a result of this an upper hydrocarbon layer is obtained containing the normal alpha olefins, substantially freed of its vinylidene content, and a lower perfluorocarboxylic acid layer containing dissolved therein the ester resulting from reaction of said perfluorocarboxylic acid with the vinylidene compounds.

The two layers can be separated from each other in any convenient manner, but preferably the lower acid layer is merely drawn off from the base of the container employed in the purification procedure. Desirably the normal alpha olefins remaining are washed, for example, with a sodium hydroxide solution and water, to remove entrained perfluorocarboxylic acid therefrom. This results in a lower aqueous layer containing dissolved sodium salt of the perfluorocarboxylic acid if any, which is then drawn off and separated from the upper hydrocarbon layer as before. Also, desirably, the normal alpha olefin mixture can be dried in any suitable manner, for example, by passing the same over a drying agent such as anhydrous sodium sulfate. Alternatively, the normal alpha olefin can be purified by passing the same, after separation of the acid, through a column or bed packed with activated alumina. The olefin which elutes from the column is free of trifluoroacetic acid.

Economically, the perfluorocarboxylic acid consumed in the purification procedure described and defined herein can be recovered. The acid can be reused until the ester content of the acid is large enough to justify removal. The perfluorocarboxylic acid can be recovered by converting the ester to an alcohol and the acid, by reacting with aqueous sodium hydroxide. The free acid is neutralized and the ester saponified. The perfluorocarboxylic acid can be regenerated from the salt by acidification with a strong acid, such as hydrochloric acid.

The process defined herein can further be illustrated by the following:

*Example I*

At a temperature of 26° C. and a pressure of 0 pound per square inch gauge there was added to 10 milliliters of a hydrocarbon mixture containing 90.4 mol percent of a $C_{18}$ normal alpha olefin, 4.1 mol percent of a $C_{18}$ vinylidene-type olefin ($R_2C=CH_2$), 2.3 mol percent of a $C_{18}$ cis internal olefin ($RCH=CHR$) and 3.2 mol percent of a $C_{18}$ trisubstituted olefin ($R_2C=CHR$), said hydrocarbon mixture having been obtained from a product resulting from the polymerization of ethylene using a triethyl aluminum catalyst, three milliliters of trifluoroacetic acid. The resulting mixture was shaken for one minute and then allowed to stand for 20 minutes for separation of the hydrocarbon and the acid phases. The acid phase was then drawn off to separate the same from the hydrocarbon phase, and the latter was thereafter washed several times with four to 10 milliliter portions of water and sodium hydroxide solution to remove therefrom any acid that may have been entrained therewith. The hydrocarbon phase was further passed over anhydrous sodium sulfate for the purpose of drying the same and then analyzed. The analysis showed the presence therein of 95.6 mol percent of the normal alpha olefin, 0.8 mol percent of cis internal olefin, 3.5 mol percent of the trisubstituted olefin, but no vinylidene-type olefin.

*Example II*

At a temperature of 26° C. and a pressure of 0 pound per square inch gauge there was added to 10 milliliters of a hydrocarbon mixture containing 91.4 mol percent of $C_{12}$, $C_{14}$ and $C_{16}$ normal alpha olefins, 7.2 mol percent of $C_{12}$, $C_{14}$ and $C_{16}$ vinylidene type olefins, 1.0 mol percent of $C_{12}$, $C_{14}$ and $C_{16}$ cis internal olefins and 0.4 mol percent of $C_{12}$, $C_{14}$ and $C_{16}$ trisubstituted olefins, said mixture having been obtained from a product resulting from the polymerization of ethylene using a triethyl aluminum catalyst, three milliliters of trifluoroacetic acid. The resulting mixture was shaken for one minute and then allowed to stand for 20 minutes for separation of the hydrocarbon and the acid phases. The acid phase was then drawn off to separate the same from the hydrocarbon phase, and the latter was thereafter passed through a column packed with activated alumina. The effluent was submitted for analysis. The analysis showed the presence therein of 98.0 mol percent of the normal alpha olefins, 1.3 mol percent of the cis internal olefins, 0.5 mol percent of the trisubstituted olefins, but only 0.2 mol percent of vinylidene-type olefins.

Obviously, many modifications and variations of the invention, as hereinabove set forth, can be made without departing from the spirit and scope thereof, and therefore only such limitations should be imposed as are indicated in the appended claims.

We claim:

1. A purification procedure which comprises contacting a mixture containing at least one normal alpha olefin having at least 10 carbon atoms and at least one vinylidene-type olefin having at least 10 carbon atoms with a perfluorocarboxylic acid, thereby obtaining a hydrocarbon phase containing said normal alpha olefin and an acid phase containing said perfluorocarboxylic acid and ester resulting from the reaction of said vinylidene-type olefin with said perfluorocarboxylic acid and thereafter separating said phases from each other by mechanical means to obtain a hydrocarbon phase containing reduced amounts of said vinylidene-type olefin.

2. A purification procedure which comprises contacting a mixture containing at least one normal alpha olefin having from 12 to 20 carbon atoms and at least one vinylidene-type olefin having from 12 to 20 carbon atoms with a perfluorocarboxylic acid, thereby obtaining a hydrocarbon phase containing said normal alpha olefin and an acid phase containing said perfluorocarboxylic acid and ester resulting from the reaction of said vinylidene-type olefin with said perfluorocarboxylic acid and thereafter separating said phases from each other by mechanical means to obtain a hydrocarbon phase containing reduced amounts of said vinylidene-type olefin.

3. A purification procedure which comprises contacting a mixture containing normal alpha olefins having from 12 to 16 carbon atoms and vinylidene-type olefins having from 12 to 16 carbon atoms with a perfluorocarboxylic acid, thereby obtaining a hydrocarbon phase containing said normal alpha olefin and an acid phase containing said perfluorocarboxylic acid and ester resulting from the reaction of said vinylidene-type olefin with said perfluorocarboxylic acid and thereafter separating said phases from each other by mechanical means to obtain a hydrocarbon phase containing reduced amounts of said vinylidene-type olefin.

4. A purification procedure which comprises contacting a mixture containing at least one normal alpha olefin having at least 10 carbon atoms and at least one vinylidene-type olefin having at least 10 carbon atoms with at least about four mols of perfluorocarboxylic acid per mol of said vinylidene-type olefin at a temperature of about 0° to about 50° C., thereby obtaining a hydrocarbon phase containing said normal alpha olefin and a acid phase containing said perfluorocarboxylic acid and ester resulting from the reaction of said vinylidene-type olefin with said perfluorocarboxylic acid and thereafter separating said phases from each other by mechanical means to obtain a hydrocarbon phase containing reduced amounts of said vinylidene-type olefin.

5. A purification procedure which comprises contacting a mixture containing at least one normal alpha olefin having from 12 to 20 carbon atoms and at least one vinylidene-type olefin having from 12 to 20 carbon atoms with at least about four mols of a perfluorocarboxylic acid per mol of said vinylidene-type olefin at a temperature of about 0° to about 50° C., thereby obtaining a hydrocarbon phase containing said normal alpha olefin and an acid phase containing said perfluorocarboxylic acid and ester resulting from the reaction of said vinylidene-type olefin with said perfluorocarboxylic acid and thereafter separating said phases from each other by mechanical means to obtain a hydrocarbon phase containing reduced amounts of said vinylidene-type olefin.

6. A purification procedure which comprises contacting a mixture containing normal alpha olefins having from 12 to 16 carbon atoms and vinyldene-type olefins having from 12 to 16 carbon atoms with at least about four mols of a perfluorocarboxylic acid per mol of said vinylidene-type olefin at a temperature of about 0° to about 50° C., thereby obtaining a hydrocarbon phase containing said perfluorocarboxylic acid and ester resulting from the reaction of said vinylidene-type olefin with said perfluorocarboxylic acid and thereafter separating said phases from each other by mechanical means to obtain a hydrocarbon phase containing reduced amounts of said vinylidene-type olefin.

7. A purification procedure which comprises contacting a mixture containing at least one normal alpha olefin having at least 10 carbon atoms and at least one vinylidene-type olefin having at least 10 carbon atoms with a perfluorocarboxylic acid, thereby obtaining a hydrocarbon phase containing said normal alpha olefin and an acid phase containing said perfluorocarboxylic acid and ester resulting from the reaction of said vinylidene-type olefin with said perfluorocarboxylic acid, separating said phases from each other by mechanical means to obtain a hydrocarbon phase containing reduced amounts of said vinylidene-type olefin and thereafter treating said perfluorocarboxylic acid phase to regenerate said ester to said perfluorocarboxylic acid.

8. A purification procedure which comprises contacting a mixture containing at least one normal alpha olefin having at least 10 carbon atoms and at least one vinylidene-type olefin having at least 10 carbon atoms with trifluoroacetic acid, thereby obtaining a hydrocarbon phase containing said normal alpha olefin and an acid phase containing said trifluoroacetic acid and ester resulting from the reaction of said vinylidene-type olefin with said trifluoroacetic acid and thereafter separating said phases from each other by mechanical means to obtain a hydrocarbon phase containing reduced amounts of said vinylidene-type olefin.

9. A purification procedure which comprises contacting a mixture containing at least one normal alpha olefin having from 12 to 20 carbon atoms and at least one vinylidene-type olefin having from 12 to 20 carbon atoms with trifluoroacetic acid, thereby obtaining a hydrocarbon phase containing said normal alpha olefin and an acid phase containing said trifluoroacetic acid and ester resulting from the reaction of said vinylidene- type olefin with said trifluoroacetic acid and thereafter separating said phases from each other by mechanical means to obtain a hydrocarbon phase containing reduced amounts of said vinylidene-type olefin.

10. A purification procedure which comprises contacting a mixture containing normal alpha olefins having from 12 to 16 carbon atoms and vinylidene-type olefins having from 12 to 16 carbon atoms with trifluoroacetic acid, thereby obtaining a hydrocarbon phase containing said normal alpha olefin and an acid phase containing said trifluoroacetic acid and ester resulting from the reaction of said vinylidene-type olefin with said trifluoroacetic acid and thereafter separating said phases from each other by mechanical means to obtain a hydrocarbon phase containing reduced amounts of said vinylidene-type olefin.

11. A purification procedure which comprises contacting a mixture containing at least one normal alpha olefin having at least 10 carbon atoms and at least one vinylidene-type olefin having at least 10 carbon atoms with at least about four mols of trifluoroacetic acid per mol of said vinylidene-type olefin at a temperature of about 0° to about 50° C., thereby obtaining a hydrocarbon phase containing said normal alpha olefin and an acid phase containing said trifluoroacetic acid and ester resulting from the reaction of said vinylidene-type olefin with said trifluoroacetic acid and thereafter separating said phases from each other by mechanical means to obtain a hydrocarbon phase containing reduced amounts of said vinylidene-type olefin.

12. A purification procedure which comprises contacting a mixture containing at least one normal alpha olefin having from 12 to 20 carbon atoms and at least one vinylidene-type olefin having from 12 to 20 carbon atoms with at least about four mols of trifluoroacetic aicd per mol of said vinylidene-type olefin at a temperature of about 0° to about 50° C., thereby obtaining a hydrocarbon phase containing said normal alpha olefin and an acid phase containing said trifluoroacetic acid and ester resulting from the reaction of said vinylidene-type olefin with said trifluoroacetic acid and thereafter separating said phases from each other by mechanical means to obtain a hydrocarbon phase containing reduced amounts of said vinylidene-type olefin.

13. A purification procedure which comprises contacting a mixture containing normal alpha olefins having from 12 to 16 carbon atoms and vinylidene-type olefins having from 12 to 16 carbon atoms with at least about four mols of trifluoroacetic acid per mol of said vinylidene-type olefin at a temperature of about 0° to about 50° C., thereby obtaining a hydrocarbon phase containing said trifluoroacetic acid and ester resulting from the reaction of said vinylidene-type olefin with said trifluoroacetic acid and thereafter separating said phases from each other by mechanical means to obtain a hydrocarbon phase containing reduced amounts of said vinylidene-type olefin.

14. A purification procedure which comprises contacting a mixture containing at least one normal alpha olefin having at least 10 carbon atoms and at least one vinylidene-type olefin having at least 10 carbon atoms with trifluoroacetic acid, thereby obtaining a hydrocarbon phase containing said normal alpha olefin and an acid phase containing said trifluoroacetic acid and ester resulting from the reaction of said vinylidene-type olefin with said trifluoroacetic acid, separating said phases from each other by mechanical means to obtain a hydrocarbon phase containing reduced amounts of said vinylidene-type olefin and thereafter treating said trifluoroacetic acid phase to regenerate said ester to said trifluoroacetic acid.

15. A process according to claim 1 wherein said phases are separated by decantation.

16. A process according to claim 1 wherein said phases are separated by drawing off the lower acid phase.

17. A process according to claim 1 wherein the hydrocarbon phase after separation of the acid phase is further purified by contact with activated alumina.

References Cited by the Examiner
UNITED STATES PATENTS

| | | | |
|---|---|---|---|
| 2,386,055 | 10/1945 | Motteru | 260—677 |
| 2,775,633 | 12/1956 | Fenske et al. | 260—677 |
| 3,055,934 | 9/1962 | Heisler et al. | 260—677 |

ALPHONSO D. SULLIVAN, *Primary Examiner.*